Nov. 30, 1937.  R. CHILTON  2,100,629
TRANSMISSION
Filed July 18, 1936  2 Sheets-Sheet 1
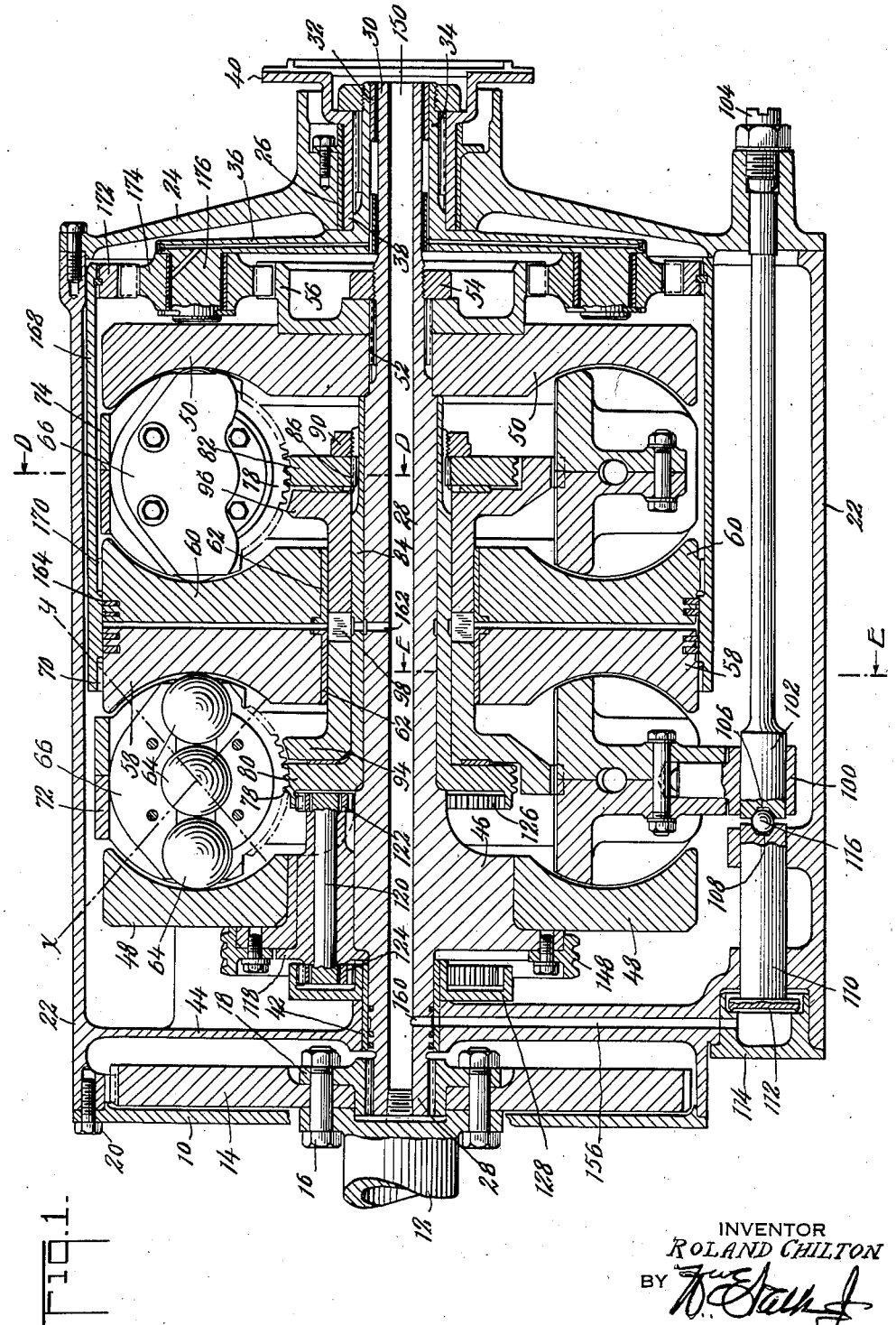
Fig.1.
INVENTOR
ROLAND CHILTON
BY 
ATTORNEY Nov. 30, 1937.　　　　R. CHILTON　　　　2,100,629
TRANSMISSION
Filed July 18, 1936　　　　2 Sheets-Sheet 2
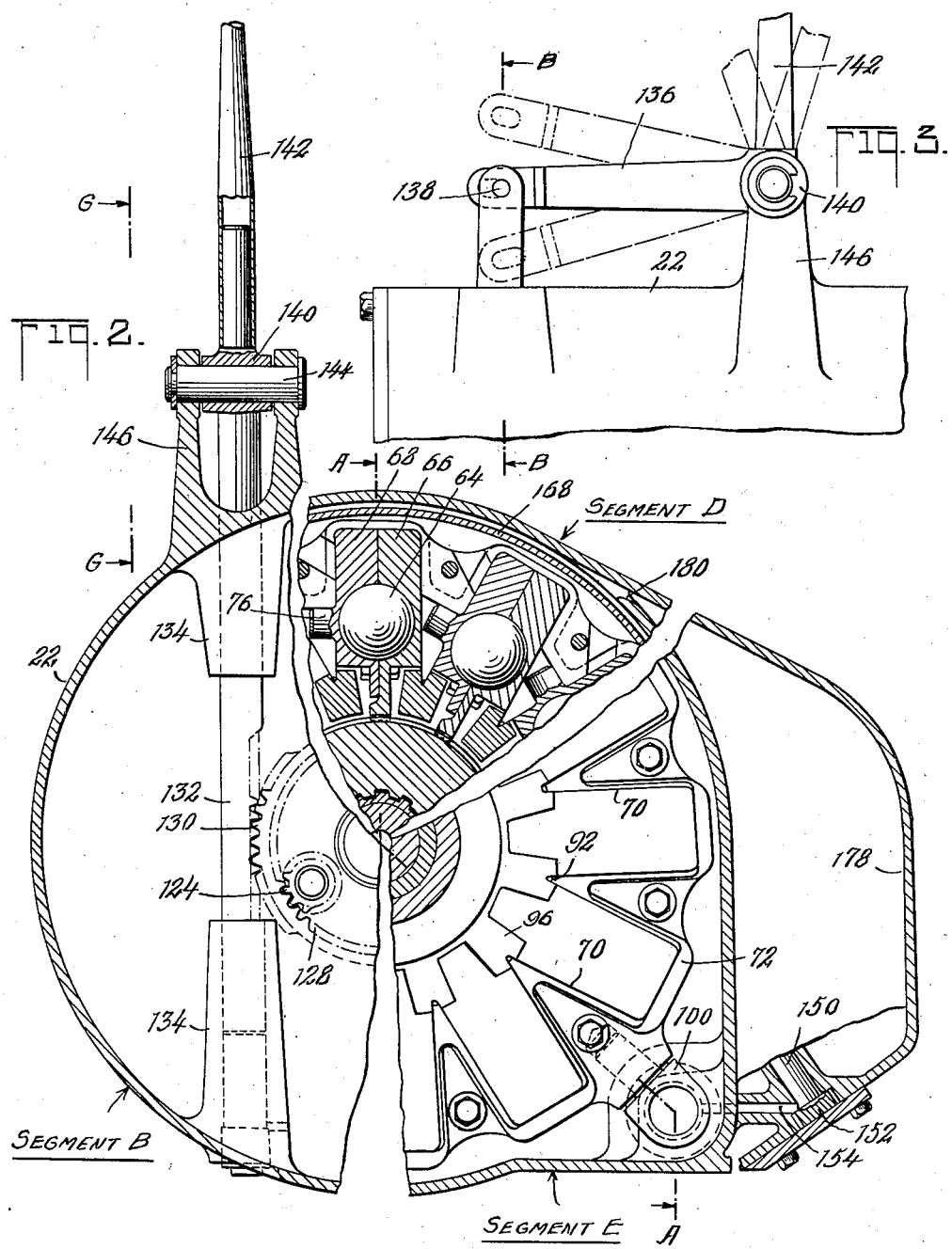
INVENTOR
ROLAND CHILTON
BY
ATTORNEY Patented Nov. 30, 1937

2,100,629

UNITED STATES PATENT OFFICE 2,100,629

TRANSMISSION

Roland Chilton, Ridgewood, N. J.

Application July 18, 1936, Serial No. 91,262

13 Claims. (Cl. 74—200)

This invention relates to variable speed transmissions of the toroidal disc type, and in certain aspects comprises a novel and improved organization of rolling bodies and of control means therefor. In other respects the invention embodies features disclosed in my Patents Nos. 2,040,830; 2,040,831; 2,040,832; 2,040,833 and 2,041,284; and in still other respects the invention comprises improvements in my copending applications Serial Nos. 728,058; 742,751; 743,515; 25,065; 40,919; 65,973; 65,974 and 65,975.

The toroidal transmissions of the prior art comprise toroidal discs drivably connected by rollers or wheels, the radius of the toroids being the same as the radius of the wheels. The transmission ratio change is obtained by angulating these wheels to contact different radii on the toroids. These transmissions run under heavy contact loads, whereby it is impracticable to effect this angulation by sliding the rims of the wheels across the discs, wherefore the control system usually incorporates means for steering the rollers to cause them to precess for ratio change. Certain of my copending applications show simplified control means for this purpose, and a prime object of the present invention is to provide a novel organization for the rolling bodies which will permit them to be angulated or precessed, for ratio change, by a direct control not requiring the steering function. In fact, in the present invention the ratio position may be changed, under contact load, with the transmission at rest, which is not practicable with the roller organizations of the prior art.

The power transmitting capacity of these transmissions is proportional (other things being equal) to the number of rolling bodies which can be arranged to contact with a pair of discs. In the prior art, the necessary steering controls take up considerable room so that, usually, only three rollers per pair of discs can be used, although the art occasionally shows four rollers. By the novel disposition of the present invention it is possible to incorporate a greatly increased number of driving connections between the discs—twelve in the specific embodiment of the drawings, and this comprises an important object of the invention.

A further object resides in providing an improved and simplified control means, and a still further object resides in a control means which does not require added circumferential space between adjacent rollers which has been one limitation to the number of rollers which could be employed in the prior art.

An additional object is to provide a simplified control means effective on roller assemblages which are closely spaced and surrounded by relatively rotating discs which prevent the application of conventional controls.

Other objects of the invention will be obvious from or will be pointed out in the following description with reference to the drawings, in which:

Fig. 1 is an axial section on the line A—A of Fig. 2;

Fig. 2 comprises segmental trans-axial sections in which, segment B—B is on the line B—B of Fig. 3; segment D is on the line D—D of Fig. 1; and segment E is on the line E—E of Fig. 1; with certain parts removed, and Fig. 3 is a fragmentary view of the control lever as viewed from the line G—G of Fig. 2.

Referring first to Fig. 1, 10 designates the back plate of a conventional engine having a conventional crankshaft 12, to which is secured a conventional flywheel 14 by bolts 16, which also secure a splined driving hub 18.

Secured to the engine back plate 10 by screws 20 is a main transmission housing 22 provided with a rear cover 24 having a bearing 26.

Splined into the driving hub 18, is a main shaft 28, having a rear pilot extension 30 supported in bushings 32 in a hub 34 of a driven planetary spider 36, to which is splined the hub 38 of a driven flange 40, which hub is supported in the bushing 26. The front end of the shaft 28 is supported in a bushing 42 carried in the front wall 44 of the housing 22.

The shaft 28 is provided with an enlarged hub 46 to which is rigidly secured a left hand toroidal disc 48; and a companion right hand disc 50 is secured on the shaft 28 by splines 52 and a nut 54 which also serves to clamp a gear 56.

A pair of intermediate toroidal discs 58 and 60 are mounted for free rotation on bushings 62 and the opposed toroidal discs are drivably connected by serial assemblages, each comprising three contacting balls 64 supported in split carriers comprising the portions 66—68 and fitted in rectangular pockets 70 in cages 72 and 74. One side of each ball carrier 68 is provided with a trunnion 76 on which the ball carrier assemblage is free to oscillate from the position shown to the positions indicated by the dotted lines X and Y of Fig. 1.

Control of this ratio changing oscillation is attained by helical gear quadrants 78 formed on the carrier members 66 and meshed with helical sun gears 80 and 82 connected together by a sleeve 84, a spline 86 and a nut 90.

Referring to Fig. 2, it will be seen that the roller carrier pockets 70 of the cages 72 and 74 define inwardly facing prongs 92, and fitted to these prongs are splined members 94 and 96 connected together by end splines at 98. By means of the members 94, 96 and 98, the two cages 72 and 74 are held against relative rotation, and the left hand cage 72 is anchored by means of an eyepiece or torque arm 100 which engages a thrust rod 102 supported by an adjustable abutment screw 104 in the rear cover 24. The left hand end of the thrust rod 102 is provided with a conical pocket 106, and a companion pocket 108 is formed in the stem 110 of a relief valve 112 cooperating with a seat member 114. A ball 116 cooperates with the pockets 106 and 108 to impress upon the valve 112 a load that is at all times proportional to the torque reaction on the cages 72—74.

It may now be seen that the cages 72—74 are stationary, together with the cage connecting members 94—96 and with the helical control sun gears 80—82; these last gears being rotated only to control the angular attitude of the ball carriers 66—68. It will also be seen that the control gears 80 are completely surrounded by mechanism comprising the closely packed carriers 66—68, cages 72—74, and the rotating toroidal discs 48—50—58—60. Accordingly, special provision is required to effect the control of these sun gears from an external operator's control as follows: The enlarged hub 46 of the main shaft 28 is provided with three circumferentially spaced bores, in which are disposed split bushings 118, carrying shafts 120 equipped at either end with similar pinions 122—124 meshed respectively with an internal gear 126 formed integral with the gear 80 and with a control gear 128 which is free for limited rotation on the exterior of an extended portion of the bushing 42. The control gear 128 is provided with an external tooth quadrant 130 (Fig. 2), with which is engaged a rack 132 slidable in bosses 134 in the housing 22, and extending therefrom to engage a lever 136 (Fig. 3), by means of a sliding pin connection 138. This lever is integral with a boss 140 furnished with an upstanding operator's control lever 142 and supported on a pin 144 carried in brackets 146.

Secured to the main shaft hub 46, is a helical pump driving gear 148 meshed with a helical pinion (not shown) on a pump shaft 150, (segment E, Fig. 2), which drives a conventional gear pump 152. The pressure side of the pump is connected, by a passage 154, to the hollow portion of the valve seat member 114, whereby the oil delivered by the pump 152 has to escape past the relief valve 112. A passage 156, Fig. 1, connects the oil system to a bore in the main shaft 28 by way of a radial hole 160, and, by a similar hole 162, the oil pressure is conveyed to the space between the discs 58—60 which comprise pistons in virtue of piston rings 164 engaging a drum 168 into which the discs are drivably splined at 170.

In the right hand end of the drum 168 there is splined a large internal gear 172, and meshed with this gear and with the gear 56 secured to the main shaft 28 are planetary pinions 174 supported on journals 176 on the driven spider 36.

At the right hand side of Fig. 1 there is seen an oil sump 178 to which the suction side of the pump 152 is connected, and to which sump oil is returned by a high level catchment slot 180, by the rotation of the drum 168.

The operation of the transmission is as follows:

Due to the use of an odd number of serially contacting balls 64 between the opposed toroidal discs, these rotate in opposite directions just as in the case when a single roller is used, as in the prior art. However, by the use of an odd number of balls anti-friction freedom for oscillation of the ball assemblage, from the position shown, to the angular positions X and Y, Fig. 1, is afforded. It is pointed out that this oscillation of the ball carriers 68—66 can be effected with a minimum of effort, even though the transmission be stationary, and regardless of the contact load.

The control gear 128 is normally stationary, wherefore the sun control gears 80—82 are also held to zero rotation by the equal sized pinions 122—124, regardless of the speed of planetization of these pinions with the main shaft 28. Thus, whether the transmission be stationary or running, the control gears 80—82 must follow any control movement impressed upon the control gear 128 through the rack 132 and control levers 136—142. This movement is transmitted to the roller carriers 66—68 by the helical teeth 78, the helix angles of the gears 80—82 being right and left hand to give opposite angulation of the roller assemblages in the respective cages 72—74.

The tangential driving effort at the contact between the balls and the discs is at all times proportional to torque reaction imposed on the cages 72—74, which reaction is sustained by the ball 116 acting on pockets 106—108 to impress upon the valve 112 an axial reaction which is at all times proportional to the torque on the cages. This relief valve, therefore, regulates the pressure delivered by the pump 152 to be at all times proportional to the torque reaction on the cages, and this hydraulic pressure is effective on the piston area of the discs 58—60, whereby the entire transmission is at all times contact-loaded with a load proportional to the tangential effort at the driving contacts, regardless of the radius of ball contact upon the discs and of the magnitude of the torque transmitted.

It will be further noted that with the balls in position Y, the contact radius with the discs 58—60, connected to the annular gear 172 is equal to the pitch radius of that gear, while the contact radius with the discs 48—50 connected to the gear 56 is equal to the pitch radius of that gear, wherefore, in the position Y, the transmission is in zero ratio—there being no rotation of the spider arm 36 or driven flange, regardless of the speed of the main shaft 28. Orientation of the roller carriers towards the position X progressively increases the driving ratio up to 1 to 1 in the position Y.

It will now be seen that in this invention the contact loads are distributed over a relatively great number of driving contacts (two sets of twelve as shown), whereby the gross contact loads in a given size of transmission may be much greater than where only three or four rollers are used, as in the prior art. The possibility of incorporating a large number of driving elements flows from the novel tiered arrangement of the triple balls and from the novel control system whereby the operator's control is brought through the rotating discs, instead of being brought in between the ball or roller elements which has required a large wasted space therebetween in the prior art. It will also be seen that the triple series of balls provides a driving connection which may be frictionlessly orientated between the discs by direct, non-steering control.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A transmission including, in combination, opposed toroidal discs, a driving connection between said discs comprising end balls contacting respective discs and a central ball contacting the first said balls, and means to roll said end balls radially across said discs to change the driving ratio of the transmission.

2. A transmission including, in combination, opposed toroidal discs, an odd plurality of mutually contacting balls arranged between said discs in rectilinear serial alignment with the end balls contacting respective discs, and means to shift said contact radially of said discs by rolling as opposed to sliding movement of said balls in virtue of said odd plurality thereof.

3. In a transmission, in combination, a pair of opposed toroidal discs, driving connections between said discs each comprising two end balls, the end balls contacting an included central ball and one of said discs, means mounting said balls in rectilinear alignment, and means to angulate said aligned balls.

4. In a transmission, in combination, opposed toroidal discs, a pair of balls contacting respective discs, an intermediate ball contacting said pair of balls, means to hold said balls in rectilinear alignment and for universal rotation, and control means to angulate said holding means.

5. In a transmission, in combination, a cage member, a ball carrier mounted for angulation in said cage, an odd plurality of balls arranged in serial mutual contact in said carrier for rotation about various axes, and toroidal discs engaging respective end balls of said plurality.

6. In a transmission, in combination, a cage member, a ball carrier mounted for angulation in said cage member, a plurality of balls arranged in serial mutual contact in said carrier, toroidal discs engaging respective end balls of said plurality, and control means to effect said angulation, said balls being free to roll in said carrier under said angulation.

7. In a transmission, in combination, a pair of opposed toroidal discs, roller carriers adapted for simultaneous angulation between said discs, an odd plurality of rollers in said carriers drivably connecting the discs, the end rollers of said plurality being rollable radially of the discs, and means to effect said angulation including a helical gear segment on each of said carriers and a helical sun gear meshed with said segments.

8. A transmission including, in combination, opposed toroidal discs, roller carriers between said discs adapted for angulation, disc-connecting rollers mounted in said carriers, a helical sun gear engaging said carriers, a planet shaft rotatable with and with respect to one of said discs, pinions on said shaft, a control gear at one side of said disc and meshed with one of said pinions, and a similar gear on the said sun gear meshed with the other pinions.

9. In a transmission, in combination, a pair of opposed toroidal discs, a planetary member rotatable with and with respect to one of said discs and having similar pinions one at the inner and one at the outer side of one of said discs, a controllable gear meshed with the outer pinion, a gear to be controlled meshed with the inner pinion, rollers connecting said discs, and a roller carrier adapted for angulation by the last said gear.

10. A transmission including, in combination, opposed discs, roller carrier means to be controlled located between said discs, a helical gear concentric with and between said discs and meshed with said carrier means, an annular gear at one side of said discs, an annular gear rigid with said helical gear, a connection between said annular gears comprising a shaft and similar planetary pinions, said shaft being carried by one of said discs, and rolling bodies in said carrier drivably connecting said discs.

11. A transmission including, in combination, a pair of rotatable discs, a plurality of roller carriers mounted for angulation between said discs, disc-connecting rollers in said carriers, angulation control means comprising a sun gear meshed with said carriers and planetary gears rotatable with one of said discs connected with said sun gear, and means to operate said planetary gears.

12. A transmission including, in combination, opposed discs, orientatable roller carriers interposed between said discs, disc-connecting rollers in said carriers, means to control the orientation of said roller carriers comprising similar annular gears respectively between and at one side of said discs, means including planet pinions connecting said annular gears, a control means engaging the outside gear, and a helical gear rigid with the inside gear and engaging said carriers.

13. In a transmission, in combination, a pair of discs, means to be controlled disposed between said discs, control means disposed at one side of said discs, and planet means rotatable with one of said discs and connecting said control means to said means to be controlled, the last said means including rolling means drivably connecting said discs.

ROLAND CHILTON.